(12) United States Patent
Taylor

(10) Patent No.: US 10,456,997 B2
(45) Date of Patent: Oct. 29, 2019

(54) LAMINATE APPARATUS WITH BONDED LINER

(71) Applicant: GTL Company, Tullahoma, TN (US)

(72) Inventor: Zachary R. Taylor, Murrieta, CA (US)

(73) Assignee: GLOYER-TAYLOR LABORATORIES LLC, Tullahoma, TN (US)

( * ) Notice: Subject to any disclaimer, the term of this patent is extended or adjusted under 35 U.S.C. 154(b) by 829 days.

(21) Appl. No.: 14/919,722

(22) Filed: Oct. 21, 2015

(65) Prior Publication Data
US 2016/0107398 A1    Apr. 21, 2016

Related U.S. Application Data

(60) Provisional application No. 62/066,606, filed on Oct. 21, 2014.

(51) Int. Cl.
| | |
|---|---|
| B29C 70/44 | (2006.01) |
| B29C 70/78 | (2006.01) |
| B29C 70/06 | (2006.01) |
| B29D 22/00 | (2006.01) |
| B32B 5/22 | (2006.01) |
| B32B 5/24 | (2006.01) |
| B32B 5/26 | (2006.01) |
| B32B 1/02 | (2006.01) |
| B32B 5/02 | (2006.01) |
| B29C 33/00 | (2006.01) |
| B29K 105/08 | (2006.01) |
| B29L 31/00 | (2006.01) |

(52) U.S. Cl.
CPC ............ *B29C 70/443* (2013.01); *B29C 70/06* (2013.01); *B29C 70/78* (2013.01); *B29D 22/003* (2013.01); *B32B 5/22* (2013.01); *B32B 5/24* (2013.01); *B32B 5/26* (2013.01); *B29C 33/0038* (2013.01); *B29K 2105/0809* (2013.01); *B29L 2031/712* (2013.01); *B32B 1/02* (2013.01); *B32B 5/02* (2013.01); *B32B 2250/20* (2013.01); *B32B 2260/021* (2013.01); *B32B 2260/046* (2013.01); *B32B 2307/714* (2013.01); *B32B 2307/7242* (2013.01); *B32B 2307/7265* (2013.01); *B32B 2439/00* (2013.01); *B32B 2439/40* (2013.01)

(58) Field of Classification Search
CPC .................................................. B29C 70/443
See application file for complete search history.

(56) References Cited

U.S. PATENT DOCUMENTS

| | | | | |
|---|---|---|---|---|
| 5,304,339 | A | * | 4/1994 | Le Comte ............... B29C 39/42 264/102 |
| 2010/0239865 | A1 | * | 9/2010 | Kallinen ................. B29C 70/46 428/411.1 |
| 2011/0174426 | A1 | * | 7/2011 | Weimer .................. B29C 70/34 156/94 |

* cited by examiner

Primary Examiner — Monica A Huson
Assistant Examiner — Kelsey C Grace
(74) Attorney, Agent, or Firm — Kunzler Bean & Adamson

(57) ABSTRACT

A laminate apparatus for engaging a fluid includes a structural medium made from plies bonded together with a resin. The structural medium defines a fluid facing surface. The laminate apparatus further includes a liner membrane bonded to the fluid facing surface of the structural medium with the resin. The liner membrane has one or more of a desired barrier characteristic and a desired chemical compatibility characteristic with respect to the fluid.

10 Claims, 8 Drawing Sheets

LAMINATE APPARATUS WITH BONDED LINER

CROSS-REFERENCE TO RELATED APPLICATION

This application claims the benefit of U.S. Provisional Patent Application No. 62/066,606, filed Oct. 21, 2014, which is incorporated herein by reference.

FIELD

The subject matter of the present disclosure relates generally to resin bonded liners for laminate apparatuses. More specifically, the present disclosure relates to liners implemented as both vacuum enclosures and resin bonded liners.

BACKGROUND

Composite containers that are used to contain gasses or liquids typically employ liners as a containment barrier and chemically-compatible surface material. These liners are either rigid, self-supporting shells or semi-rigid shells that may be pressure-stiffened. The rigid or rigidized liners are frequently used as a mandrel over which a reinforcing composite laminate is applied and cured to complete the container.

The liners in these applications serve a dual purpose by acting as rigid mandrel tooling for laminate application and as a containment barrier. Some of these liners may have sufficient structural strength to be classified as load-sharing (e.g., sharing the load with the laminate) while other liners are considered non-load-sharing. Load-sharing liners are often the most expensive component in the assembly and load-sharing liners typically represent a significant portion of the container's mass by having a greater thickness than would otherwise be required for non-load-sharing liners than are only utilized for barrier/compatibility purposes.

If, due to size or material properties, a liner cannot be readily rigidized or made to be self-supporting, a removable internal mandrel is used to support and maintain the shape of the liner during application of the structural laminate. Such mandrels can be costly, especially when needed for closed-end composite containers such as pressure vessels and tankage. An alternate approach for some large containers is to prefabricate the container's rigid laminate and secondarily apply a bond liner or surfacing material to the inner surface of the laminate. The liner in such an application is typically not continuous but is applied piecemeal, making integration labor intensive and subject to exposed bonded joints.

Another type of composite container developed primarily for cryogenic use is a linerless composite container. Linerless composite containers have been developed to avoid the mismatch between the coefficients of thermal expansion between a liner and reinforced laminate and the resultant thermally-induced stresses. These linerless composite containers rely on the laminate's matrix to provide a leak-free barrier. However, the resin systems tend to be brittle, particularly at low temperature where micro-cracking reduces the barrier integrity of the laminate's matrix.

SUMMARY

From the foregoing discussion, it should be apparent that a need exists for an apparatus, system, and method for resin bonded laminate structures that overcome the limitations of conventional resin bonded structures. Beneficially, such an apparatus, system, and method would improve the ease, efficiency, and effectiveness of manufacturing resin bonded laminate structures with liners.

The subject matter of the present application has been developed in response to the present state of the art, and in particular, in response to the problems and needs in the art that have not yet been fully solved by currently available manufacturing methods. Accordingly, the present disclosure has been developed to provide an apparatus, system, and method for resin bonded laminate structure with liners that overcome many or all of the above-discussed shortcomings in the art.

Disclosed herein is one embodiment of a laminate apparatus for engaging a fluid. The laminate apparatus includes a structural medium made from plies bonded together with a resin. The structural medium defines a fluid facing surface. The laminate apparatus further includes a liner membrane bonded to the fluid facing surface of the structural medium with the resin. The liner membrane has one or more of a desired barrier characteristic and a desired chemical compatibility characteristic with respect to the fluid.

According to one implementation, the liner membrane is free of vacuum lines and resin injection lines. In another implementation, the laminate apparatus is a cryogenic fluid containment vessel and the fluid is a cryogenic fluid. In yet another implementation, the structural medium further includes reinforcing fabric plies.

Also disclosed herein is one embodiment of a laminate system that includes a structural mold, a structural medium, and a liner membrane. The structural medium includes resin infusible plies and the structural medium defines a fluid facing surface and an opposite surface. The opposite surface engages the structural mold. The liner membrane is bondable to the fluid facing surface of the structural medium and has one or more of a desired barrier characteristic and a desired chemical compatibility characteristic with respect to the fluid. The liner membrane is sealable about the fluid facing surface of the structural medium to form, in conjunction with the structural mold, a vacuum enclosure about the structural medium for a vacuum resin infusion process.

According to one implementation, the structural mold includes one or more vacuum and resin injection lines that extend through the structural mold and are open to the vacuum enclosure. In another implementation, the liner membrane is free of vacuum lines and resin injection lines. In one implementation, the structural medium further includes a lip disposed between the fluid facing surface and the opposite surface. In such an implementation, the liner membrane extends about the fluid facing surface and the lip of the structural medium and is sealed to the structural mold to form the vacuum enclosure.

In one implementation, the system further includes a framing structure integrated into the liner membrane disposed at an opening defined by the structural medium. The framing structure restrains the liner membrane at the opening and is configured to facilitate the sealing of the liner membrane to the mold.

Also disclosed herein is one embodiment of a method for manufacturing a laminate apparatus for engaging a fluid. The method includes installing a structural medium in a structural mold, the structural medium having resin infusible plies and having a first surface and a second surface opposing the first surface. The second surface engages the structural mold. The method further includes extending a liner membrane about the first surface of the structural medium and sealing the liner membrane to the structural mold to form, in conjunction with the structural mold, a vacuum enclosure about the structural medium. Still further, the method includes evacuating the vacuum enclosure, infusing the vacuum enclosure with resin, and bonding the liner membrane to the first surface of the structural medium to form the laminate apparatus. Finally, the method includes removing the laminate apparatus from the structural mold.

According to one implementation, the structural medium further has a lip disposed between the first and second surface and the method further includes extending the liner membrane about the first surface and the lip of the structural medium before sealing the liner membrane to the structural mold to form the vacuum enclosure. In one implementation, infusing the vacuum enclosure with resin and bonding the liner membrane to the first surface of the structural medium occur substantially concurrently. In another implementation, evacuating the vacuum enclosure precedes infusing the vacuum enclosure with resin.

In one implementation, the structural medium defines an opening to the laminate apparatus and the method further includes engaging a framing structure in the opening to define an enclosed inner volume of the laminate apparatus. According to such an implementation, bonding the liner membrane to the first surface of the structural medium further includes pressurizing the enclosed inner volume of the laminate apparatus.

In one implementation, the structural mold has one or more vacuum and resin injection lines that extend through the structural mold and are open to the vacuum enclosure. In such an implementation, evacuating the vacuum enclosure and infusing the vacuum enclosure with resin comprise coupling a vacuum source and a resin injector to the one or more vacuum lines and resin injection lines, respectively. In such an implementation, the liner membrane is free from the one or more vacuum and resin injection lines.

According to one implementation, the laminate apparatus is a cryogenic fluid containment vessel and the fluid is a cryogenic fluid. In another implementation, the structural medium further includes reinforcing fabric plies.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
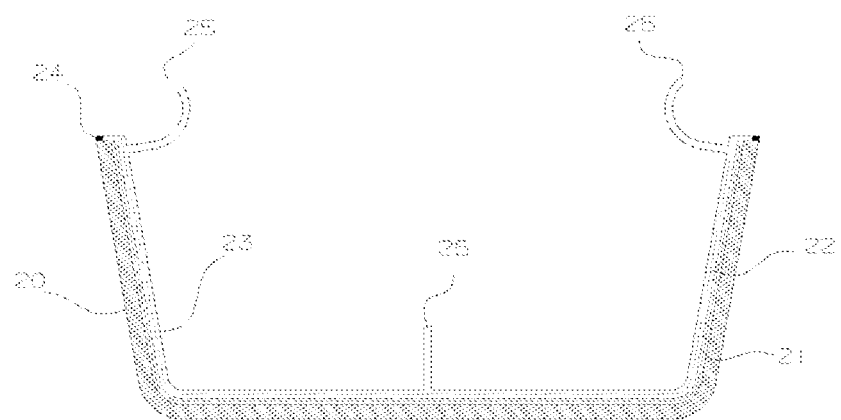
FIG. 1 is a cross-sectional view of a conventional vacuum resin infusion system.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

The disclosure presented herein provides a laminate apparatus for the containment and/or handling of gas, liquid, or liquefied gas with a thin liner or membrane, the liner being flexible and non-structural, and the liner being used during container fabrication as a vacuum-sealing membrane during vacuum resin infusion of the laminate. The primary advantage of the present disclosure is that it facilitates the fabrication of large or long continuously-lined composite laminate structures with high fiber volume, low void content, and minimum liner thickness and mass, while imposing modest tooling and labor requirements.

The laminate apparatus includes a structural, fiber-reinforced composite laminate and a thin, leak-tight liner or barrier membrane. The liner membrane may be either a primary or supplemental barrier material. The fabrication process for the laminate apparatus is a derivative of the vacuum assisted resin transfer molding (VARTM) or vacuum infusion process (VIP). Such processes involve using a dry reinforcing fabric that is positioned between a shape-defining mold surface and a flexible vacuum bag. A vacuum is applied to the interior space and then a resin is allowed to infuse the fabric plies and cure. However, instead of using a removable vacuum bag (i.e., a vacuum bag that is either disposable or reusable) through which vacuum and resin injection lines are typically routed, the liner membrane of the present disclosure doubles in function as an internal, integral vacuum bag (or at least a compliant, sealable mold surface) and a permanent barrier liner. The system of the present disclosure utilizes vacuum lines and resin injection ports that are routed primarily through the shape-defining structural mold.

If the outer shape-defining mold is structurally capable of containing internal pressure, the manufacturing method may also allow the mold to be closed and pressure to be applied to the interior of the container after resin infusion to further consolidate the laminate apparatus. In other words, the pressure facilitates merging the resin and/or liner membrane with the structural medium (e.g., plies). The supplemental pressure may also be useful in expressing out surplus resin in the structural medium and minimizing trapped voids in much the same way as autoclaves do for autoclave-cured laminates.

The approach allows a thin and/or large continuous liner to be integrated into a composite containment structure, and eliminates the need for removable internal mandrel tooling (such as a segmented mandrel) to support the liner during buildup of the composite laminate. It also allows laminate wetout and liner-to-laminate bonding to happen concurrently.

The liner membrane, according to one embodiment, is thin and/or flexible, and bondable to the structural medium (composite). The thickness and flexibility may be relative to the size of the container and mechanical properties of the liner material. The laminate-adjacent surface of the liner can be bondable or modified so as to be bondable to the laminate. The liner membrane material may be selected for its barrier properties, workability, and compatibility with the fluid to be contained or otherwise engaged. Selection of the liner membrane material may also be dependent on the type and strength of vacuum used in the resin infusion process and/or the type of resin employed. For example, the liner membrane may be selected according to the liner membrane's chemical compatibility with a specific resin. Materials that the liner may be comprised of include, but are not limited to: plastic film or sheet, elastomer film or sheet, a thin metal shell or metal foil, reinforced and/or filled plastic film or sheet, reinforced and/or filled elastomer, plastic/foil laminations, metalized film, multilayer films, or any combination thereof. The liner membrane may be molded, extruded, cast, or otherwise produced as a single piece, or may be a welded, bonded, laminated, or otherwise fabricated assembly, or a combination thereof. Additionally, the liner membrane may be contour-fitted to a desired shape, oversized for loose fit, or undersized and pulled or stretched to shape against the laminate.

The liner may have one or more openings for access to the interior of the container. The liner openings may be sealed to the outer mold prior to evacuation and infusion of the laminate. As an alternative, rigidizing, sealing elements, or fittings for access to the interior of the container may be integrated into openings of the liner prior to laminate integration, and the fittings or rigidizing elements subsequently sealed to the outer mold prior to evacuation and infusion of the laminate. The fittings may be designed so as to reinforce the local penetration through the container's structural laminate and may also be designed so as to accept a sealable attachment or closure, particularly for composite containers that will be pressurized during or after fabrication.

The structural medium includes plies that form a composite stack that may be applied to the mold's inner surface. The liner membrane is then sealed about the fluid facing surface of the structural medium. Pre-impregnated adhesive films or reinforcing plies may also be included as needed in the structural medium as a supplement to the infusible plies. Resin flow media may also be positioned between the mold and structural medium or within the laminate. A removable peel ply material may also be integrated into the structural medium, where appropriate.

The external shape-defining mold may either be a sealable rigid mold, or may be a flexible external mold that may be rigidized by internal pressure or with rigid reinforcing elements to support the mold's weight and maintain the external mold's shape and dimensional requirements. The mold may be split, segmented or tapered as needed, or any combination thereof to facilitate removal of the container after curing of the laminate. Openings or fittings for evacuation and resin infusion of the laminate shall primarily be integrated into the mold's surface as required.

FIG. 1 is a cross-sectional view of a conventional vacuum resin infusion system. In FIG. 1, one of the more conventional approaches representative of the state of the art for fabricating an open-topped composite container such as a tank, vat, or channel using the vacuum infusion process is depicted. The dry fabric plies 21 are applied to the rigid mold 20. Peel-ply and resin infusion medium 22 may also be applied before the laminate stack is covered with a vacuum bag 23 and the bagging material is sealed (sealant tape 24, sealant adhesive, etc.) to the mold. Vacuum and resin infusion lines 25 are typically routed through the vacuum bag.

Once the assembly is sealed, the volume between the mold and vacuum bag is evacuated and resin is pulled into the reinforcing plies and cured. The cured laminate may then be removed from the mold and the vacuum bag, flow medium, and peel ply removed from the part. If such a container, fabricated in a female mold, needed a liner to provide an impermeable barrier or chemical compatibility with contained fluids, then the liner would need to be secondarily applied and bonded to the inner surface of the laminate.

Figure 2A:
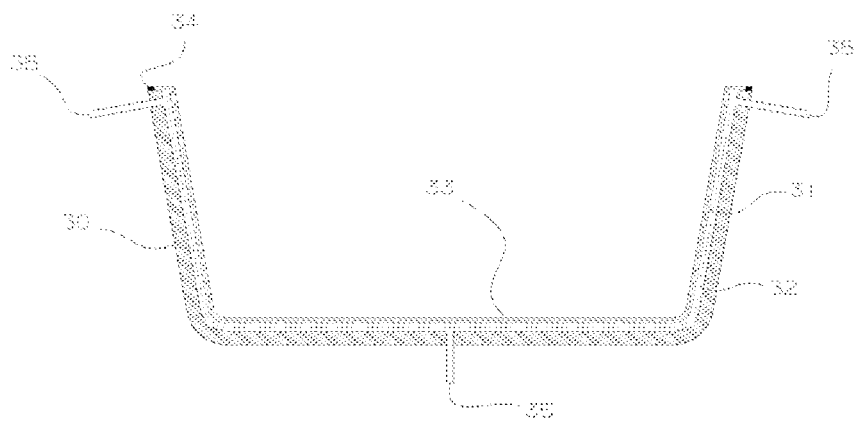
FIG. 2A is a cross-sectional view of one embodiment of a liner membrane permanently bondable to a structural medium in a vacuum resin infusion system.

FIG. 2A is a cross-sectional view of one embodiment of a liner membrane permanently bondable to a structural medium in a vacuum resin infusion system. As described above, FIG. 2A depicts an alternate approach to fabricating the above container according to the present disclosure. Instead of using a disposable/removable vacuum bag, as shown in FIG. 1, the vacuum bag is replaced with a thin, bondable liner membrane 33 that has a desired barrier and/or compatibility characteristic with respect to the fluid. The liner membrane 33 is positioned and sealed (e.g., sealant tape 34 or sealant adhesive) about the reinforcing fabric plies 31 that form the structural medium. The vacuum and resin infusion lines 35 are routed predominantly through the outer mold 30. In one embodiment, all of the vacuum and resin infusion lines 35 are routed through the outer mold 30 and no vacuum/resin infusion lines are routed through the liner membrane 33. For example, since the liner membrane 33 is used as both a vacuum liner during manufacturing and a permanent barrier liner during use, the routing of vacuum and/or resin infusion lines through the liner membrane 33 would potentially impart thickness non-uniformity to the liner membrane 33 or otherwise introduce defects and/or inconsistencies in the liner membrane 33. Alternatively, if vacuum and/or resin infusion lines were routed through the liner membrane 33, additional processing/manufacturing steps may be required to remove the excess liner material that forms the vacuum/infusion line. Peel ply fabric 32 may also be included between the mold surface and the reinforcing plies.

Figure 2B:
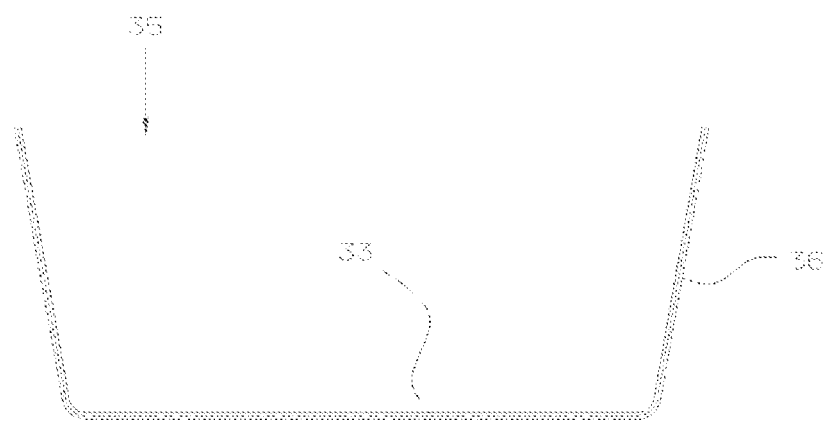
FIG. 2B is a cross-sectional view of one embodiment of an open-ended laminate vessel apparatus with a bonded liner membrane.

Generally, the laminate apparatus may be sealed (described below), evacuated, resin infused, and cured as per the vacuum infusion process described above. However after de-molding (i.e., removing the mold) the laminate apparatus, the liner membrane would remain an integral part of the finished container 35, as shown in FIG. 2B. In other words, the liner membrane 33 functions as the vacuum bag and is bonded to the now cured structural medium 36. In one embodiment, as briefly described above, the liner membrane 33 is sealed to the mold 30 such that the mold 30 and the liner membrane 33 cumulatively form the vacuum enclosure. As shown in FIG. 2A, the liner membrane 33 extends around a lip of the reinforcement plies 31 and is sealed to the mold, thus perfecting the vacuum enclosure. In one embodiment, rigidizing or sealing elements or fittings for access to the interior of the container may be integrated into openings of the liner prior to laminate integration, and the fittings or rigidizing elements subsequently sealed to the outer mold prior to evacuation and infusion of the laminate. The fittings may be designed so as to reinforce the local penetration through the container's structural laminate and may also be designed so as to accept a sealable attachment or closure, particularly for composite containers that will be pressurized during or after fabrication.

Figure 3B:
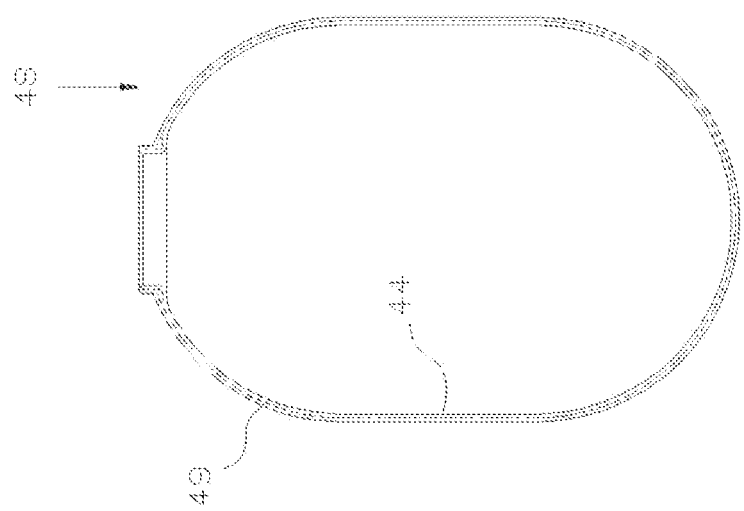
FIG. 3B is a cross-sectional view of one embodiment of an open-ended laminate tank apparatus with a bonded liner membrane.
Figure 3A:
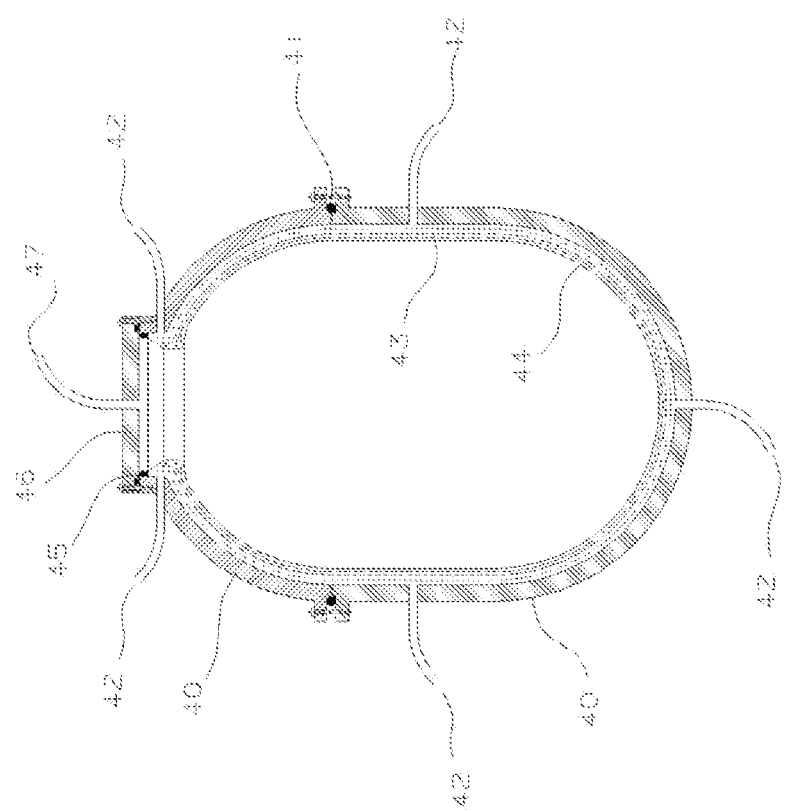
FIG. 3A is a cross-sectional view of one embodiment of a liner membrane permanently bondable to a structural medium in a vacuum resin infusion system.

FIG. 3A is a cross-sectional view of one embodiment of a liner membrane permanently bondable to a structural medium in a vacuum resin infusion system. The system in FIG. 3A may be utilized for making a closed-end container (i.e., laminate apparatus). The mold 40 shown is segmented to facilitate removal of the finished part and the segments are sealable 41 with respect to one another. The vacuum and resin infusion lines 42 may be predominantly routed through the mold. The reinforcing plies 43 that form the structural medium and the liner membrane 44 are installed in the mold 40 and the liner membrane is sealed to the mold 45 to form a vacuum enclosure. After evacuating the enclosure (or concurrently while evacuating the enclosure), the plies that form the structural medium are infused with resin. Once infused, a closure 46 with a fluid pressurization line 47 may be installed so as to seal the container and/or mold opening, and the interior volume of the assembly may be pressurized. The pressurization facilitates the consolidation between the liner membrane and the structural medium and further forces out surplus resin and voids. Once cured, the pressure can then be vented and the laminate apparatus may be removed from the mold.

Figure 3C:
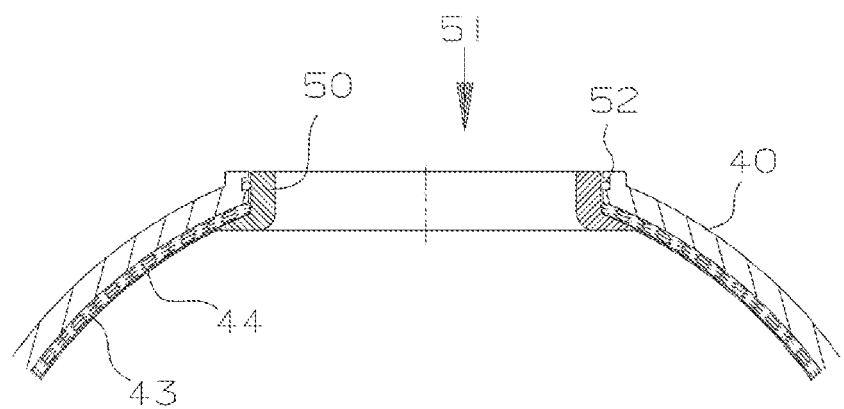
FIG. 3C is a cross-sectional view of one embodiment of an open-ended laminate tank apparatus with an auxiliary structural component.

A sectioned view of the formed laminate apparatus 48 is shown in FIG. 3B with the liner membrane 44 and cured structural medium 49 integrated. An alternate approach to a container's access opening is shown in FIG. 3C, wherein a sealable rigidizing element or framing structure 50 is integrated into the liner membrane 44 at a container opening 51. The framing structure restrains the liner at the opening and may be used to facilitate the sealing of the liner assembly to the mold 52 and/or may be use after fabrication to secure and seal a fitting or closure at the container opening.

Figure 4A:
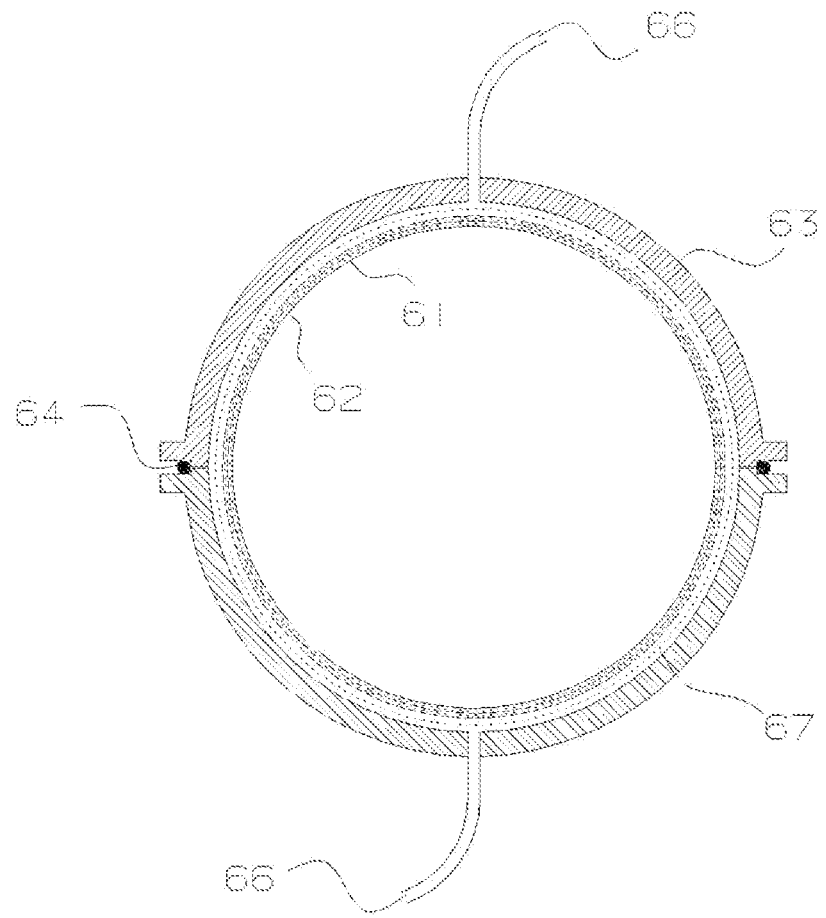
FIG. 4A is a front cross-sectional view of one embodiment of a liner membrane permanently bondable to a structural medium in a vacuum resin infusion system.
Figure 4B:
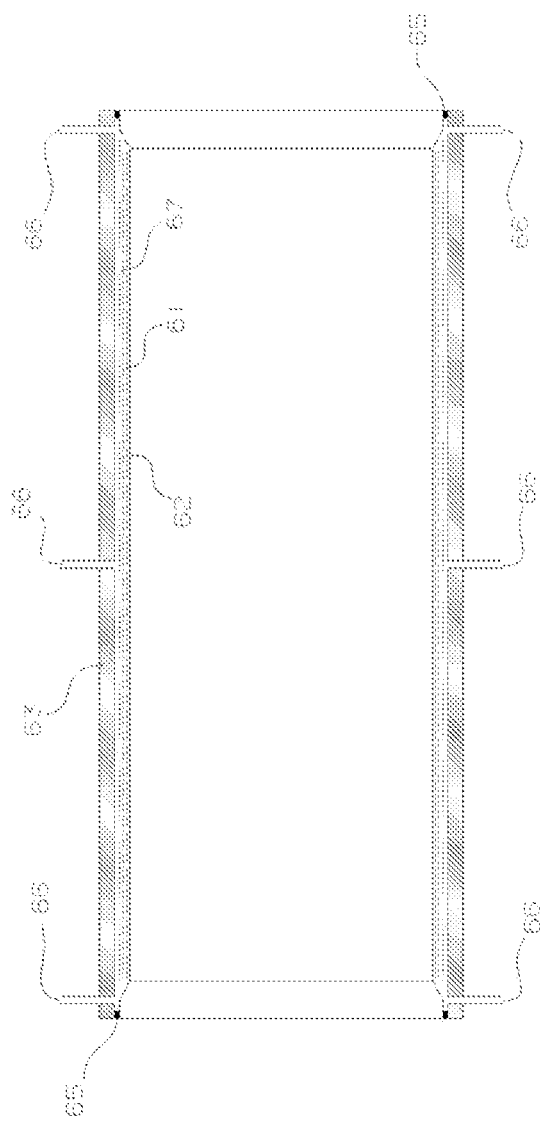
FIG. 4B is a side cross-sectional view of one embodiment of a liner membrane permanently bondable to a structural medium in a vacuum resin infusion system.
Figure 4C:
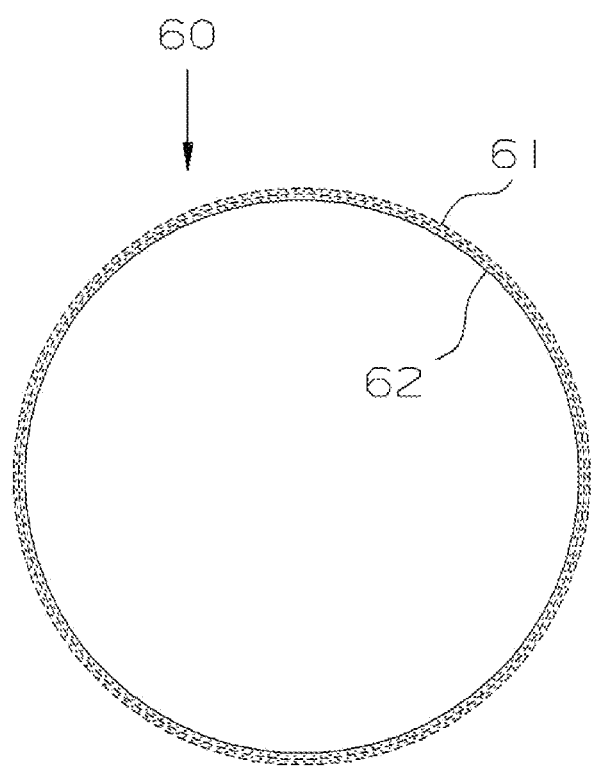
FIG. 4C is a cross-sectional view of one embodiment of an open-ended laminate tube apparatus with a bonded liner membrane.

FIG. 4A is a front cross-sectional view of one embodiment of a liner membrane permanently bondable to a structural medium in a vacuum resin infusion system. The laminate apparatus to be formed is a pipe, tube, or conduit 60 (FIG. 4C) that incorporates a structural medium 61 and a thin and/or flexible liner membrane 62. FIG. 4B is a side cross-sectional view of one embodiment of the liner membrane 62 permanently bondable to the structural medium 61 in a vacuum resin infusion system. The system in 4B shows an outer mold 63, the structural medium 61, the liner membrane 62, and a seal 64 between mold sections, with vacuum and resin infusion lines 66 integrated into the mold. Peel ply and infusion medium 67 may optionally be integrated between the mold and reinforcing plies of the structural medium. FIG. 4C is a cross-sectional view of one embodiment of an open-ended laminate tube apparatus 60 with a bonded liner membrane 62 bonded to the structural medium 61.

Figure 5:
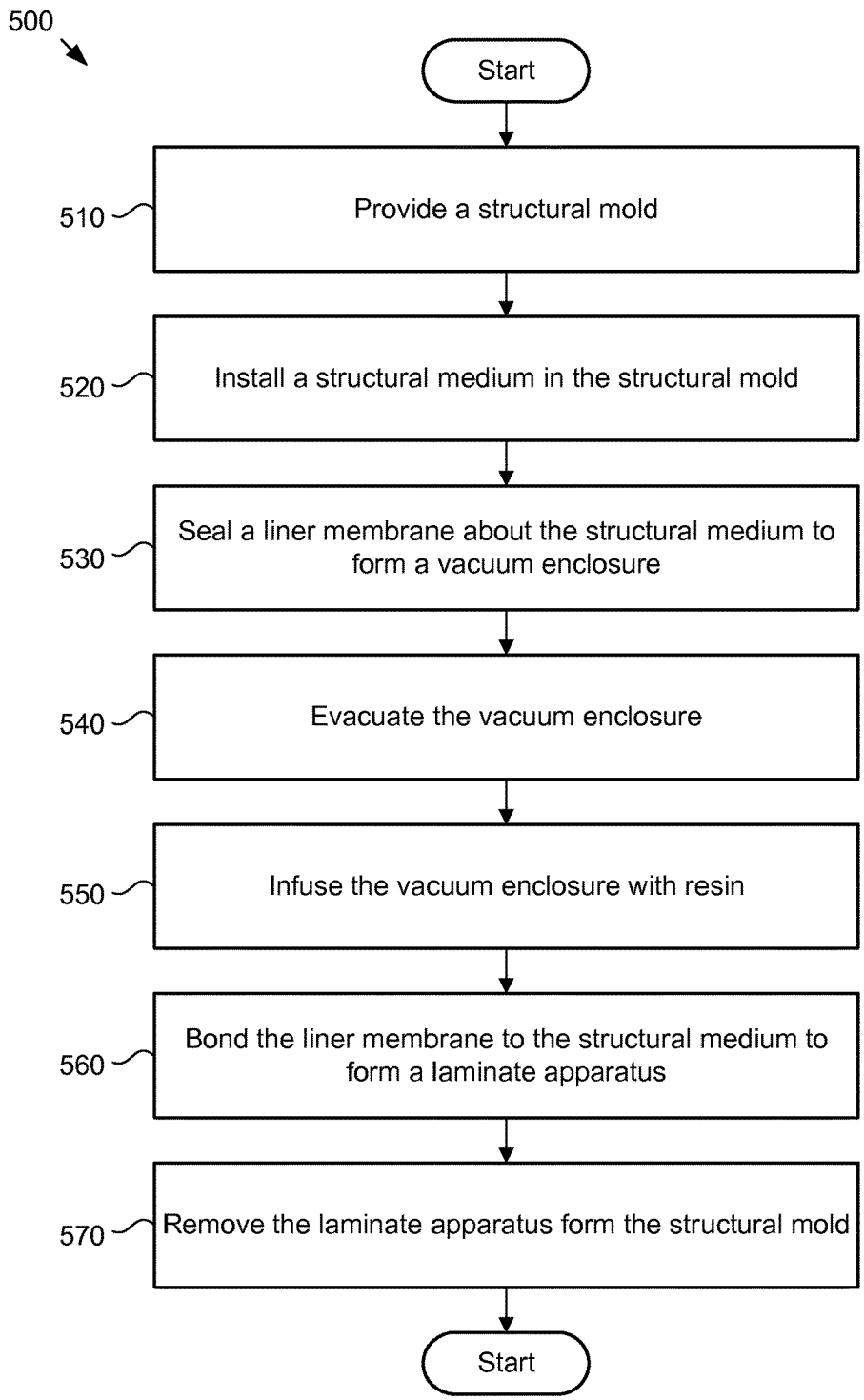
FIG. 5 is a schematic flowchart diagram of one embodiment of a method for manufacturing a laminate apparatus.

FIG. 5 is a schematic flowchart diagram of one embodiment of a method 500 for manufacturing a laminate apparatus. The method 500 includes providing a structural mold at 510, installing a structural medium in the structural mold at 520, and sealing a liner membrane about at least the fluid facing surface of the structural medium to form a vacuum enclosure about the structural medium at 530. The method 500 further includes evacuating the vacuum enclosure at 540, infusing the vacuum enclosure with resin at 550, and bonding the liner membrane to the fluid facing surface of the structural medium to form the laminate apparatus at 560, with the laminate apparatus being a composite of the structural medium and the liner membrane. The method 500 further includes removing the laminate apparatus from the structural mold at 570.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a laminate apparatus for engaging a fluid, the method comprising:
    installing a structural medium in a structural mold, wherein the structural medium comprises resin infusible plies, the structural medium further having a first surface and a second surface opposing the first surface, wherein the second surface engages the structural mold;
    extending a liner membrane about the first surface of the structural medium and sealing the liner membrane to the structural mold to form, in conjunction with the structural mold, a vacuum enclosure about the structural medium, wherein the liner membrane is the outermost layer of the vacuum enclosure;
    evacuating the vacuum enclosure;
    infusing the vacuum enclosure with resin;
    permanently bonding the liner membrane to the first surface of the structural medium to form the laminate apparatus; and
    removing the laminate apparatus from the structural mold.

2. The method of claim 1, wherein the structural medium further comprises a lip disposed between the first and second surface, the method further comprising extending the liner membrane about the first surface and the lip of the structural medium before sealing the liner membrane to the structural mold to form the vacuum enclosure.

3. The method of claim 1, wherein infusing the vacuum enclosure with resin and bonding the liner membrane to the first surface of the structural medium occur substantially concurrently.

4. The method of claim 1, wherein evacuating the vacuum enclosure precedes infusing the vacuum enclosure with resin.

5. The method of claim 1, wherein the structural medium defines an opening to the laminate apparatus, wherein the method further comprises engaging a framing structure in the opening to define an enclosed inner volume of the laminate apparatus.

6. The method of claim 5, wherein bonding the liner membrane to the first surface of the structural medium further comprises pressurizing the enclosed inner volume of the laminate apparatus.

7. The method of claim 1, wherein the structural mold comprises one or more vacuum and resin injection lines that extend through the structural mold and are open to the vacuum enclosure, wherein evacuating the vacuum enclosure and infusing the vacuum enclosure with resin comprise coupling a vacuum source and a resin injector to the one or more vacuum lines and resin injection lines, respectively.

8. The method of claim 7, wherein the liner membrane is free from the one or more vacuum and resin injection lines.

9. The method of claim 1, wherein the laminate apparatus is a cryogenic fluid containment vessel and the fluid is a cryogenic fluid.

10. The method of claim 1, wherein the structural medium further comprises reinforcing fabric plies.

* * * * *